(12) United States Patent
Samanta et al.

(10) Patent No.: US 8,977,893 B2
(45) Date of Patent: Mar. 10, 2015

(54) ACCELERATED REBUILD AND ZERO TIME REBUILD IN RAID SYSTEMS

(75) Inventors: Sumanesh Samanta, Bangalore (IN); Luca Bert, Norcross, GA (US); Satadal Bhattacharjee, Milpitas, CA (US)

(73) Assignee: LSI Corporation, San Jose, CA (US)

( * ) Notice: Subject to any disclaimer, the term of this patent is extended or adjusted under 35 U.S.C. 154(b) by 343 days.

(21) Appl. No.: 13/399,190

(22) Filed: Feb. 17, 2012

(65) Prior Publication Data

US 2013/0219214 A1 Aug. 22, 2013

(51) Int. Cl.
*G06F 11/00* (2006.01)
*G06F 11/16* (2006.01)
*G06F 11/10* (2006.01)

(52) U.S. Cl.
CPC ........ *G06F 11/1662* (2013.01); *G06F 11/1076* (2013.01)
USPC ......................................................... 714/6.24

(58) Field of Classification Search
CPC ............ G06F 11/1662; G06F 11/2094; G06F 11/1076
See application file for complete search history.

(56) References Cited

U.S. PATENT DOCUMENTS

| | | | |
|---|---|---|---|
| 5,960,169 A * | 9/1999 | Styczinski | 714/6.12 |
| 6,223,252 B1 | 4/2001 | Bandera et al. | |
| 6,567,892 B1 | 5/2003 | Horst et al. | |
| 7,370,248 B2 | 5/2008 | Tapper et al. | |
| 2005/0144512 A1* | 6/2005 | Ming | 714/6 |
| 2008/0123278 A1* | 5/2008 | Curnalia et al. | 361/685 |
| 2012/0303891 A1* | 11/2012 | Benhase et al. | 711/114 |

* cited by examiner

*Primary Examiner* — Charles Ehne
(74) *Attorney, Agent, or Firm* — Suiter Swantz pc llo

(57) ABSTRACT

A RAID data storage system incorporates permanently empty blocks into each stripe, distributed among all the data storage devices, to accelerate rebuild time by reducing the number of blocks that need to be rebuilt in the event of a failure.

20 Claims, 9 Drawing Sheets

ACCELERATED REBUILD AND ZERO TIME REBUILD IN RAID SYSTEMS

FIELD OF THE INVENTION

The present invention is directed generally toward data storage systems, and more particularly to RAID architectures with inherently accelerated rebuilt time.

BACKGROUND OF THE INVENTION

One common large scale data storage system is the Redundant Array of Independent Disks (RAID). RAID data storage systems include multiple independent data storage devices, controlled by a single computer, which may be utilized as though they were a single unit. RAID data storage systems generally include some mechanism to recover data in the event one of the independent data storage devices fails. For example, in a RAID 5 data storage system, all of the independent data storage devices are organized into logical stripes such that each logical stripe includes one logical data block from each data storage device. One logical data block in each logical stripe contains data produced by performing an exclusive disjunction operation on all of the other data blocks in the logical stripe. When a data storage device in a RAID 5 data storage system fails, each data block on the failed data storage device can be recovered by performing an exclusive disjunction operation on all of the other data blocks in the same logical stripe.

As data storage device capacity has increased, the time to rebuild a failed data storage device has increased many times. In a RAID data storage system with data storage devices having terabytes of capacity, rebuilds can take hours or days. During a rebuild, a data storage system may be vulnerable; a data storage device failure during rebuild may result in data loss. Also, data retrieval from a data storage system during rebuild may be slow because the rebuild process creates additional processor overhead. In degraded condition, retrieved data has to be rebuilt (from parity) and is not readily available as in optimal drives. For example, if the data to be rebuilt falls on the failed disk, all other disks must be read and parity calculated, to get data on failed disk. That is the primary reason of slow performance of degraded systems.

Rebuild operations may be accelerated by skipping empty portions of a data storage device, but mechanisms for tracking empty portions of data storage devices are cumbersome, create significant overhead, and may require substantial amounts of metadata to implement.

Consequently, it would be advantageous if data storage architecture and method existed that were suitable for reducing rebuilt time in a RAID data storage system.

SUMMARY OF THE INVENTION

Accordingly, the present invention is directed to a novel method and architecture for reducing rebuild time in a RAID data storage system.

One embodiment of the present invention is a RAID data storage system having blocks designated as permanently empty. The blocks are distributed throughout the disks and stripes of the system such that, in the event of a failure, each disk contains empty blocks that do not need to be rebuilt, and each stripe contains empty blocks that do not need to be included in the rebuild process of other blocks in that stripe.

Another embodiment of the present invention includes a RAID data storage system configured to reorganize blocks whenever a new disk is added such that empty space is permanently stripped into existing disks and existing stripes. Empty space does not need to be rebuilt, therefore rebuild time is reduced. Furthermore, empty blocks do not need to be considered when reconstructing a block from parity data, therefore overhead and bandwidth usage is also reduced.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
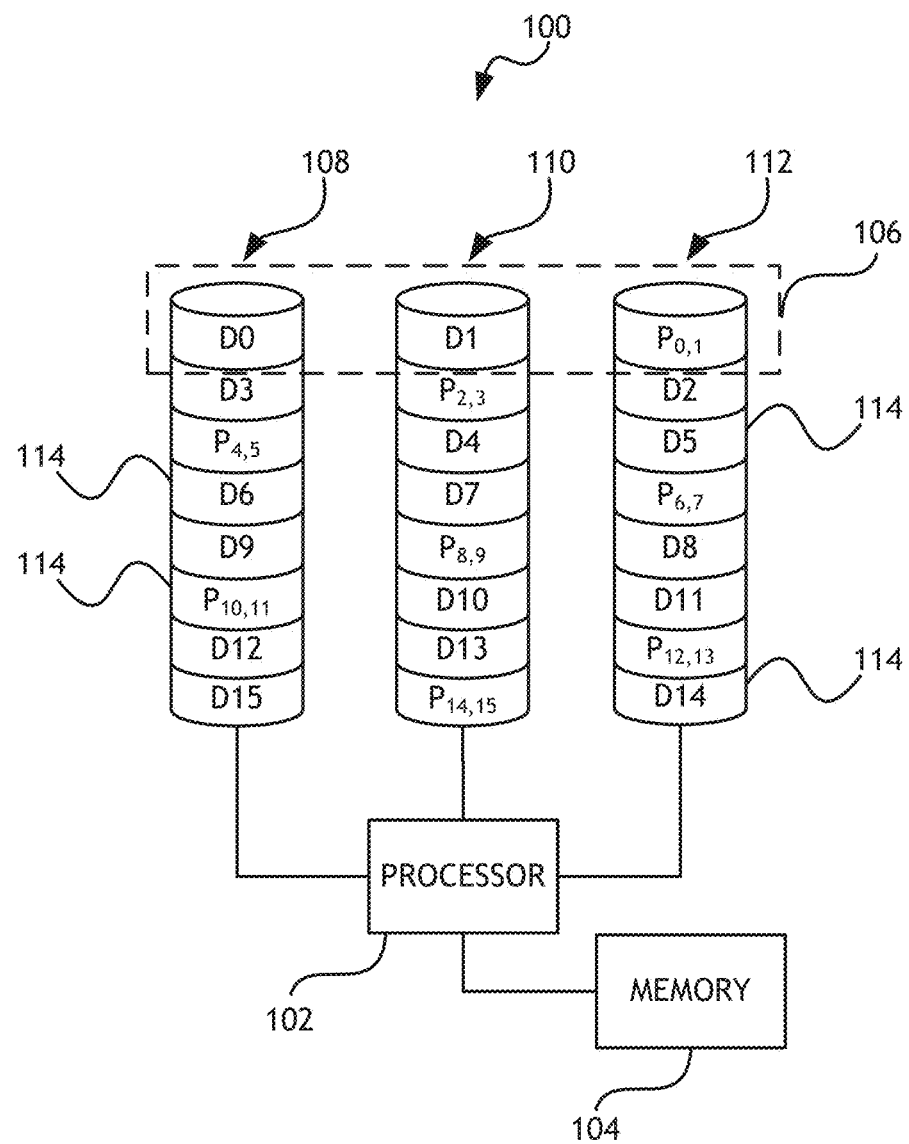
FIG. 1 shows a block diagram of a RAID 5 data storage system.

Referring to FIG. 1, an embodiment of a RAID 5 data storage system 100 is shown. The RAID 5 data storage system 100 may include a processor 102, memory 104 connected to the processor 102 and a plurality of data storage devices 108, 110, 112. Each of the plurality of data storage devices 108, 110, 112 may be divided into one or more equally sized data blocks 114. The data blocks 114 may be organized into logical stripes 106 such that each stripe 106 contains one data block 114 from each data storage device 108, 110, 112. In a RAID 5 data storage system 100 such as the one depicted in FIG. 1, one data block 114 in each stripe 106 may be a "parity" block. Parity blocks may contain the result of a bitwise exclusive disjunction operation (XOR) performed on all of the other data blocks 114 in that stripe 106. For example, in a RAID 5 data storage system 100 having three data storage devices, a stripe 106 may contain three data blocks 114; two of those data blocks (D0 and D1) would contain stored data, the remaining data block ($P_{0,1}$) would contain parity data derived by performing an exclusive disjunction of data blocks D0 and D1. In the event a single data storage device 108, 110, 112 fails, all of the data from that failed data storage device 108, 110, 112 may be recovered by performing an exclusive disjunction operation on all of the remaining data blocks in each stripe 106; the output from such exclusive disjunction operation is the data from the data block 114 in that stripe 106 that had been on the failed data storage device 108, 110, 112. The recovered data may be written to a data block on a new data storage device (not shown).

Rebuilding a failed data storage device may be a resource and time intensive process. Performing an exclusive disjunction operation to recover a data block from a failed data storage device requires all of the remaining data from the same stripe. To rebuild an entire data storage device effectively requires a complete read of all of the remaining data on all of the remaining data storage devices. The rebuild process may negatively impact available bandwidth to the remaining data storage devices and therefore availability of the RAID 5 data storage system 100.

Figure 2:
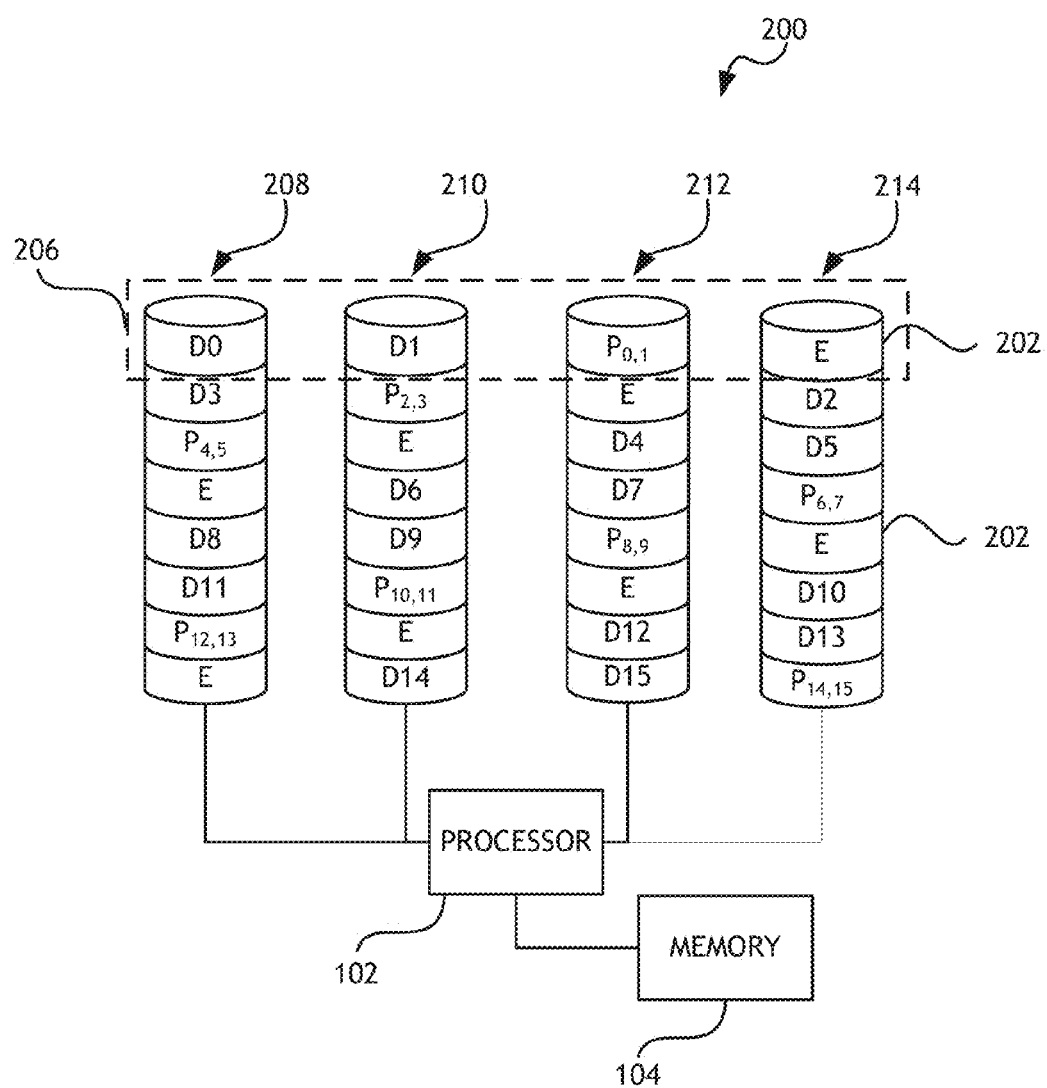
FIG. 2 shows a block diagram of the RAID 5 data storage system of FIG. 1 after a disk has been added according to at least one embodiment of the present invention.

Referring to FIG. 2, an embodiment of a RAID 5 data storage system 200 according to the present invention is shown. The RAID 5 data storage system 200 according to the present invention may include a processor 102, memory 104 connected to the processor 102 and a plurality of data storage devices 208, 210, 212, 214. Each of the plurality of data storage devices 208, 210, 212, 214 may be divided into one or more equally sized data blocks. The data blocks may be organized into logical stripes 206 such that each stripe 206 contains one data block from each data storage device 208, 210, 212, 214. A RAID 5 data storage system 200 according to the present invention may conform to all of the standards associated with RAID 5. In a RAID 5 data storage system 200 according to the present invention such as the one depicted in FIG. 2, one data block in each stripe 206 may be designated a permanently "empty" block 202. Empty blocks 202 are data blocks that do not contain data or parity information, and that the RAID 5 data storage system 200 has flagged to remain permanently empty. Empty blocks 202 may be flagged to remain permanently empty based on an algorithm whereby data blocks may be designated as empty blocks 202 based on a numerical property associated with the data block. Empty blocks 202 are not reserve space, but are maintained in a permanently empty state for the purpose of accelerating the rebuild process in event of a failure, as more fully described below.

Empty blocks 202 may be distributed such that each stripe 206 includes one empty block 202, and each data storage device 208, 210, 212, 214 includes substantially similar numbers of empty blocks depending on the number of data storage devices and number of stripes in the RAID 5 data storage system 200. All of the empty blocks in the RAID 5 data storage system 200 may equal the capacity of approximately one data storage device 208, 210, 212, 214. Conceptually, the empty capacity of one data storage device 208, 210, 212, 214 is "striped into" the remaining data storage devices 208, 210, 212, 214.

Figure 3:
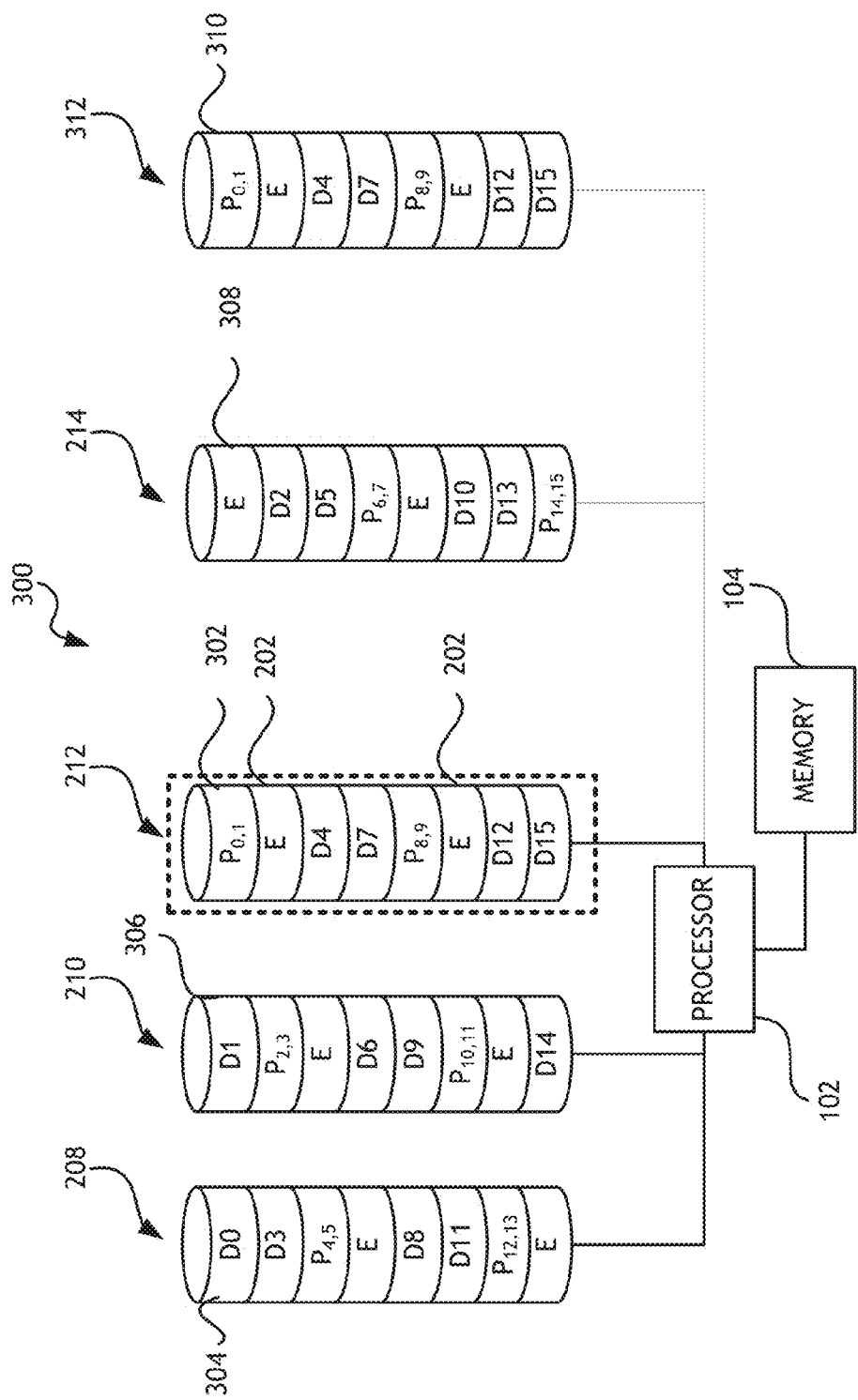
FIG. 3 shows a block diagram of the RAID 5 data storage system of FIG. 2 after a single disk failure and rebuild.

Referring to FIG. 3, an embodiment of a RAID 5 data storage system 300 according to the present invention is shown, wherein one data storage device has failed. In a RAID 5 data storage system 300, when a data storage device fails, the content of the failed data storage device 212 must be rebuilt on a new data storage device 312 using information stored on the remaining data storage devices 208, 210, 214. In a RAID 5 data storage system 300 according to the present invention, the processor 102 may determine that certain data blocks are empty blocks 202 based on an algorithm whereby data blocks may be designated as empty blocks 202 based on a numerical property associated with the data block. Where the empty blocks 202 are located on the failed data storage device 212, the processor 102 may completely skip the rebuild process for that data block, thereby reducing the total rebuild time for the failed data storage device 212 and reducing the bandwidth usage during the rebuild process because the processor 102 may not need to read data from the data blocks in the remaining data storage 208, 210, 214 that are in the same stripe as the empty block 202. Furthermore, the processor 102 may not need to read data from empty blocks 202 in the remaining data storage devices 208, 210, 214, to rebuild those data blocks in the failed data storage device 212 that do contain data or parity information.

For example; in the RAID 5 data storage system 300 depicted in FIG. 3, the processor 102 would not need to rebuild the empty blocks 202 on the failed data storage device 212. In the exemplary embodiment shown in FIG. 3, empty blocks 202 account for two of eight data blocks on the failed data storage device 212; therefore, the processor 102 may only need to rebuild six of eight data blocks. Every empty block 202 that does not need to be rebuilt also reduces the number of data blocks that need to be read during the rebuild process because the processor 102 does not need to read any data from the remaining data storage devices 208, 210, 214 in the same stripe as an empty block 202 on the failed data storage device 212.

For those data blocks on the failed data storage device 212 that do need to be rebuilt, the processor 102 may not need to read empty blocks from the remaining data storage devices 208, 210, 214. For example; in the RAID 5 data storage system 300 depicted in FIG. 3, the processor 102 rebuilding a parity block 302 from the failed data storage device 212 may need to read all of the data blocks 304, 306, 308 in the same stripe from the remaining data storage devices 208, 210, 214. However, a data block 308 in the stripe located on one of the remaining data storage devices 214 may be an empty block. The processor 102 may determine that a data block is an empty block based on an algorithm whereby data blocks may be designated as empty blocks based on a numerical property associated with the data block. The processor 102 may therefore rebuilt the parity block 302, and store the rebuilt parity block 310 on the new data storage device 312, by performing an exclusive disjunction operation on only data block 304, 306 in two of the three remaining data storage devices 208, 210.

One skilled in the art will appreciate that in the RAID 5 data storage system 300 depicted in FIG. 3, the processor 102 performing a rebuild operation on a failed data storage device 212 may only need to read twelve data blocks (D0, D1, D5, $P_{4,5}$, D6, $P_{6,7}$, D8, D9, D13, $P_{12,13}$, D14, $P_{14,15}$). In a RAID 5 data storage system such as depicted in FIG. 1, a processor may need to read sixteen data blocks to rebuild a failed data storage device. A RAID 5 data storage system according to the present invention therefore features reduced rebuild time and reduced bandwidth cost during rebuild.

Figure 4:
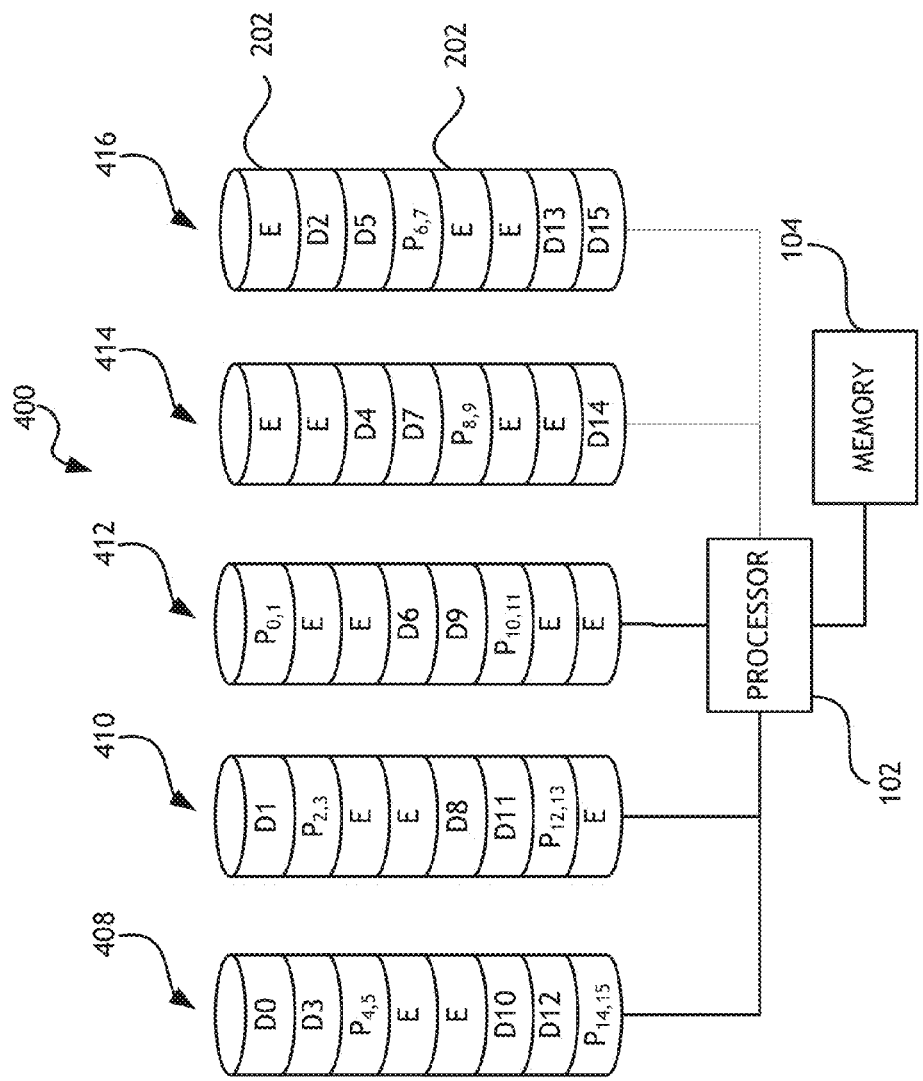
FIG. 4 shows a block diagram of the RAID 5 data storage system of FIG. 1 after two disks have been added according to at least one embodiment of the present invention.

Referring to FIG. 4, another embodiment of a RAID 5 data storage system 400 according to the present invention is shown. The RAID 5 data storage system 400 according to the present invention may include a processor 102, memory 104 connected to the processor 102 and a plurality of data storage devices 408, 410, 412, 414, 416. Each of the plurality of data storage devices 408, 410, 412, 414, 416 may be divided into one or more equally sized data blocks. The RAID 5 data storage system 400 according to the present invention may conform to all of the standards associated with RAID 5, and may include all of the features of the RAID 5 data storage system depicted in FIG. 2. In this embodiment of a RAID 5 data storage system 400, two data blocks in each stripe 206 may be designated empty blocks 202. Empty blocks 202 may be distributed such that each stripe includes two empty block 202, and each data storage device 408, 410, 412, 414, 416 includes substantially similar numbers of empty blocks depending on the number of data storage devices and the number of stripes in the RAID 5 data storage system 400. All of the empty blocks in the RAID 5 data storage system 400 may equal the capacity of approximately two data storage devices 408, 410, 412, 414, 416. Conceptually, the empty capacity of two data storage devices 408, 410, 412, 414, 416 is "striped into" the remaining data storage devices 408, 410, 412, 414, 416. One skilled in the art will appreciate that the distribution of empty blocks 202 depicted in FIG. 4 is exemplary in nature, and that other configurations may be possible within the parameters set forth herein.

All of the advantages described in reference to FIG. 3 apply to the embodiment depicted in FIG. 4. Rebuild time for a data storage device failure in the RAID 5 data storage system 400 depicted in FIG. 4 may be further accelerated because of additional empty blocks 202 that the processor 102 may ignore during the rebuild process. For example; in the event one data storage device 416 fails, the processor 102 would only need to read ten data blocks from the remaining data storage devices 408, 410, 412, 414 (two data blocks each to rebuild the five non-empty blocks).

Figure 5:
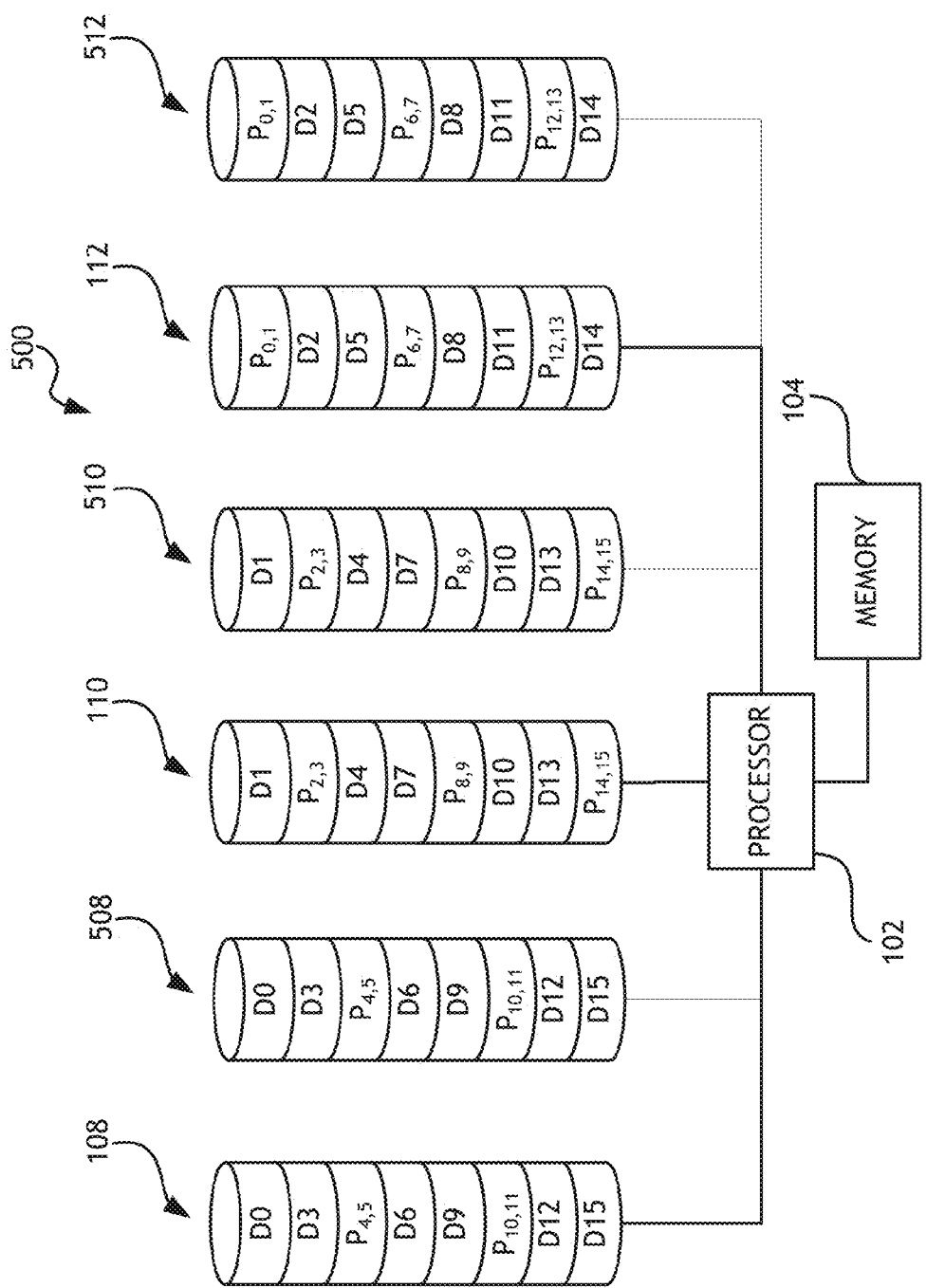
FIG. 5 shows a block diagram of a RAID 5 data storage system wherein every disk is replicated.

Referring to FIG. 5, another embodiment of a RAID 5 data storage system 500 according to the present invention is shown. The RAID 5 data storage system 500 according to the present invention may include a processor 102, memory 104 connected to the processor 102, a plurality of data storage devices 108, 110, 112, and a plurality of replicated data storage devices 508, 510, 512 were each replicated data storage device 508, 510, 512 is a copy of one of the plurality of data storage devices 108, 110, 112. Each of the plurality of data storage devices 108, 110, 112, and plurality of replicated data storage devices 508, 510, 512 may be divided into one or more equally sized data blocks. In this embodiment of a RAID 5 data storage system 500, a single data storage device 108, 110, 112 failure may not require any immediate action to rebuild the failed data storage device 108, 110, 112 because all of the data on any one data storage device 108, 110, 112 may continue to be available from a replicated data storage device 508, 510, 512. For example; in the RAID 5 data storage system 500 depicted in FIG. 5, all of the data on the first data storage device 108 is replicated on the first replicated data storage device 508. In the event the first data storage device 108 failed, the processor 102 may redirect all read or write requests to the first replicated data storage device 508. The rebuild process in such a situation would include adding a new data storage device (not shown) to the RAID 5 data storage system 500, then copying all of the data from the first replicated data storage device 508 to the new data storage device. This embodiment reduces the overhead for restoring a data storage system in the event of a single data storage device failure. In fact, a data storage system according to this embodiment would only include exclusive disjunction operations to rebuild a failed data storage device when both a data storage device and its replica fail; for example, if the first data storage device 108 and the first replicated data storage device 508 were inaccessible at the same time.

Furthermore, a data storage system 500 according to this embodiment could engage in load balancing for read operations. The processor 102 in a data storage device 500 according to this embodiment may execute write operations to both the data storage device 108, 110, 112 and the replicated data storage device 508, 510, 512 simultaneously, and may only indicate a successful write when the write operations to both the the data storage device 108, 110, 112 and the replicated data storage device 508, 510, 512 are successful.

Figure 6:
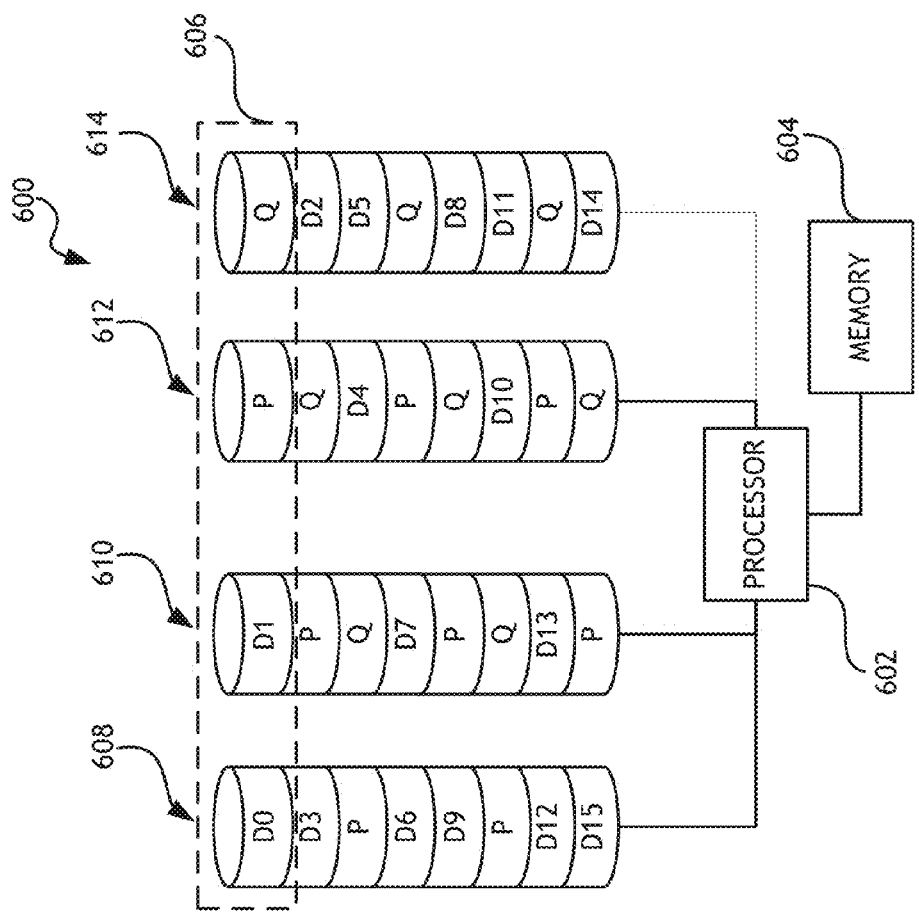
FIG. 6 shows a block diagram of a RAID 6 data storage system.

All of the embodiments described in reference to FIG. 1, FIG. 2, FIG. 3, FIG. 4 and FIG. 5 depict a RAID 5 data storage system. One skilled in the art will appreciate that all of the principals are equally applicable to RAID 6 data storage systems. Referring to FIG. 6, an embodiment of a RAID 6 data storage system 600 is shown. The RAID 6 data storage system 600 may include a processor 602, memory 604 connected to the processor 602 and a plurality of data storage devices 608, 610, 612, 614. Each of the plurality of data storage devices 608, 610, 612, 614 may be divided into one or more equally sized data blocks. The data blocks may be organized into logical stripes 606 such that each stripe 606 contains one data block from each data storage device 608, 610, 612, 614. In a RAID 6 data storage system 600 such as the one depicted in FIG. 6, two data blocks in each stripe 606 may be "parity" blocks, with one parity block (denoted P in each stripe) produced by performing an exclusive disjunction operation on all of the non-parity data blocks within the stripe 606, and the second parity block (denoted Q in each stripe) produced by performing an exclusive disjunction operation on all of the non-parity blocks within the stripe, modified by a bitwise operation known in the art. For example, in a RAID 6 data storage system 600 having four data storage devices, a stripe 606 may contain four data blocks; two of those data blocks (D0 and D1) would contain stored data, the remaining two data blocks (P and Q) would contain parity data; P would contain parity data derived by performing an exclusive disjunction of data blocks D0 and D1, and Q would contain parity data derived by performing an exclusive disjunction operation on data block D0, modified by a bitwise function, and D1, modified by a bitwise function, such that the processor 602 may recover D0 or D1 given certain information. Processes for producing Q are known in the art. In the event any two data storage devices 608, 610, 612, 614 fail, all of the data from that failed data storage devices 608, 610, 612, 614 may be recovered.

Rebuilding one or more failed data storage devices, especially in a RAID 6 data storage system, may be a resource and time intensive process. Performing an exclusive disjunction operation to recover a data block from a failed data storage device requires all of the data from the same stripe. To rebuild an entire data storage device effectively requires a complete read of all of the remaining data on all of the remaining data storage devices. Furthermore, deriving lost data from a Q parity block is a multi-step process that requires significantly more computation than an exclusive disjunction operation. The rebuild process may negatively impact available bandwidth to the remaining data storage devices and therefore availability of the RAID 6 data storage system 600.

Figure 7:
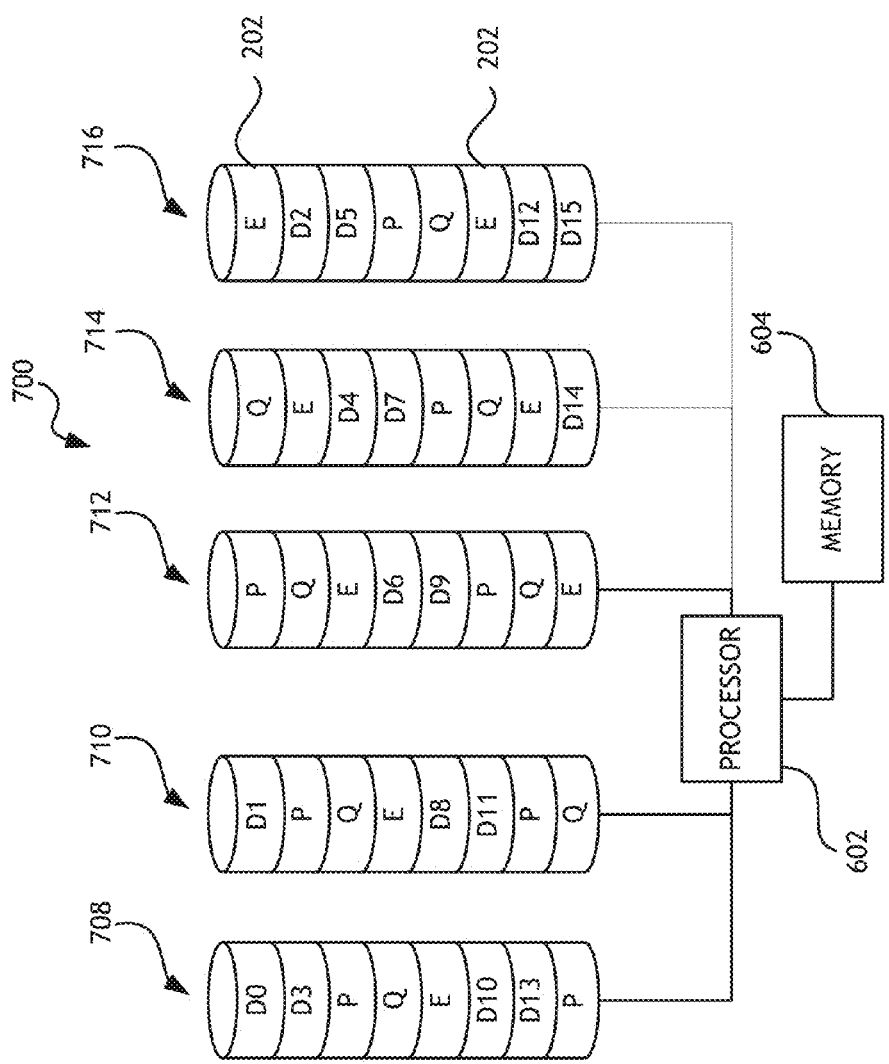
FIG. 7 shows a block diagram of the RAID 6 data storage system of FIG. 6 after a disk has been added according to at least one embodiment of the present invention.

Referring to FIG. 7, an embodiment of a RAID 6 data storage system 700 according to the present invention is shown. The RAID 6 data storage system 700 according to the present invention may include a processor 602, memory 604 connected to the processor 602 and a plurality of data storage devices 708, 710, 712, 714, 716. Each of the plurality of data storage devices 708, 710, 712, 714, 716 may be divided into one or more equally sized data blocks. A RAID 6 data storage system 700 according to the present invention may conform to all of the standards associated with RAID 6. In a RAID 6 data storage system 700 according to the present invention such as the one depicted in FIG. 7, one data block in each stripe may be designated an empty block 202. Empty blocks 202 may be flagged to remain permanently empty based on an algorithm whereby data blocks may be designated as empty blocks 202 based on a numerical property associated with the data block. Empty blocks 202 are not reserve space, but are maintained in a permanently empty state for the purpose of accelerating the rebuild process in event of a failure, as more fully described herein.

Empty blocks 202 may be distributed such that each stripe includes one empty block 202, and each data storage device 708, 710, 712, 714, 716 includes substantially similar numbers of empty blocks (the number of empty blocks 202 in each data storage device 708, 710, 712, 714, 716 may depend on the number of data blocks in each data storage device 708, 710, 712, 714, 716, and the algorithm used to distribute the empty blocks 202). All of the empty blocks in the RAID 6 data storage system 700 may equal the capacity of approximately one data storage device 708, 710, 712, 714, 716. Conceptually, the empty capacity of one data storage device 708, 710, 712, 714, 716 is "striped into" the remaining data storage devices 708, 710, 712, 714, 716.

All of the features described in reference to RAID 5 data storage system according to the present invention are also present in RAID 6 data storage systems according to the present invention.

Figure 8:
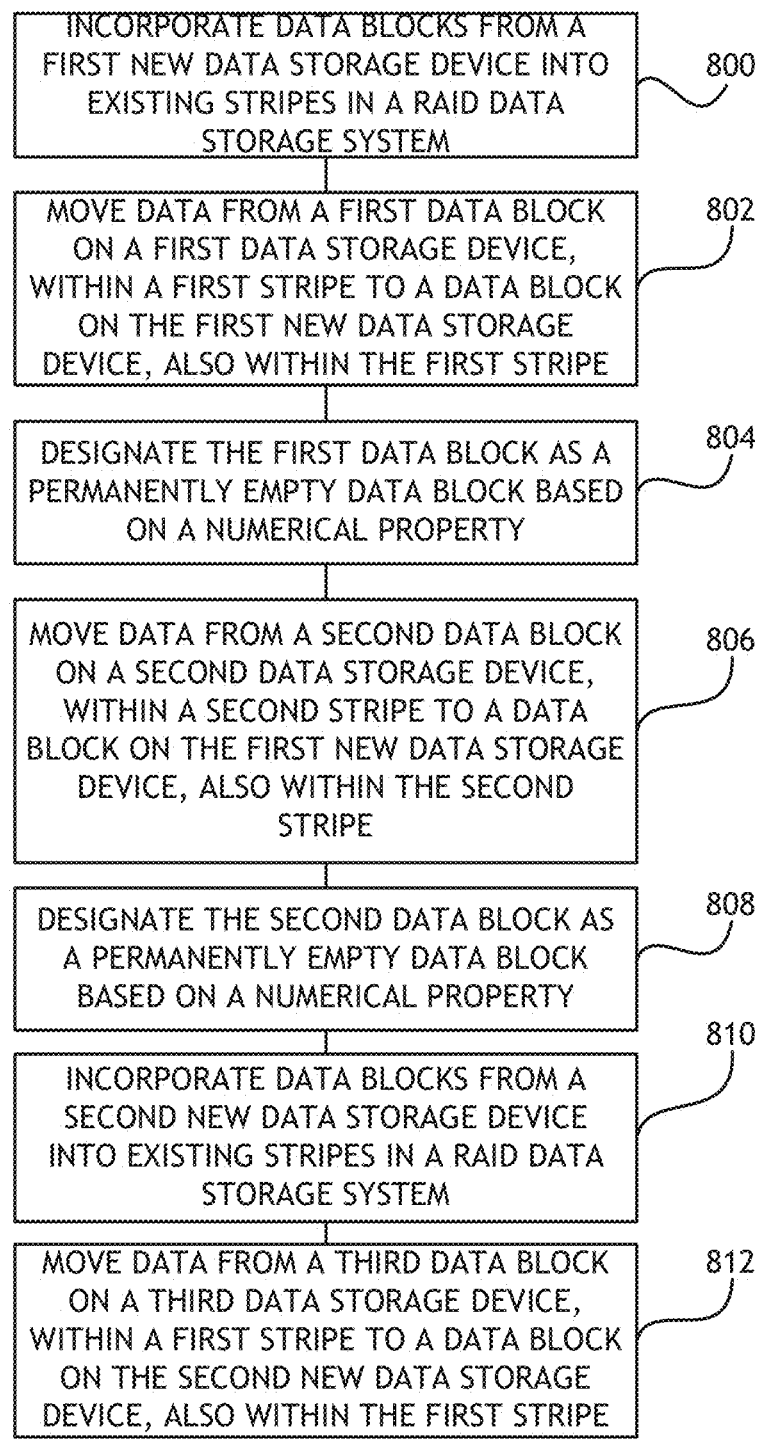
FIG. 8 shows a flowchart for a method of adding a disk to a RAID data storage system according to the present invention.

Referring to FIG. 8, a flowchart for incorporating a data storage device into a RAID data storage system is shown. In a RAID data storage system (such as RAID 5 or RAID 6) including a processor, memory and a plurality of data storage devices, when a first new data storage device is added, the processor may incorporate 800 the data blocks from the first new data storage device into existing stripes in the RAID data storage system. Incorporating 800 data blocks into existing stripes may include modifying metadata associated with each existing stripe or with each data block, altering tables stored in the memory, or any other process known in the art. The process may then move 802 data from a first data block on a first data storage device, within a first stripe, to a data block on the first new data storage device, also within the first stripe. The processor may then designate 804 the first data block on the first data storage device as a permanently empty block based on an algorithm whereby data blocks may be designated as empty blocks based on a numerical property associated with the data block such as memory address or block number. The processor may then move 806 data from a second data block on a second data storage device, within a second stripe, to a data block on the first new data storage device, also within the second stripe. The processor may then designate 804 the second data block on the second data storage device as a permanently empty block based on an algorithm whereby data blocks may be designated as empty blocks based on a numerical property associated with the data block such as memory address or block number. By this method, a processor incorporating a first new data storage device into a RAID data storage system may incorporate empty blocks into the RAID data storage system such that each stripe includes at least one empty block, and empty blocks are distributed among the data storage devices.

Furthermore, if a second new data storage device were added to the RAID data storage system, the processor may incorporate 810 the data blocks from the second new data storage device into existing stripes in the RAID data storage system. The process may then move 812 data from a third data block on a third data storage device, within the first stripe, to a data block on the second new data storage device, also within the first stripe. By this method, a processor incorporating a second new data storage device into a RAID data storage system may incorporate additional empty blocks into the RAID data storage system such that each stripe includes at least two empty blocks, and empty blocks are distributed among the data storage devices.

Figure 9:
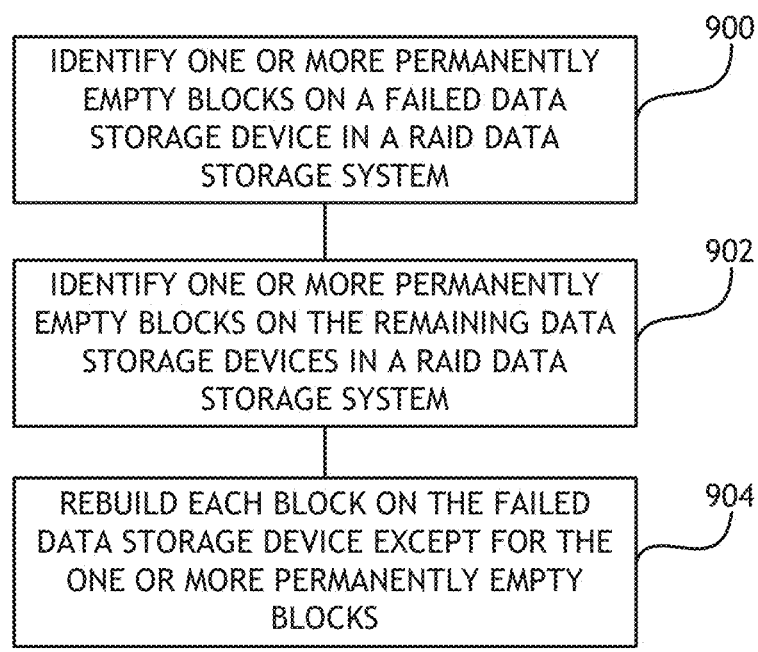
FIG. 9 shows a flowchart for a method of rebuilding a failed disk in a RAID data storage system according to the present invention.

Referring to FIG. 9, a flowchart for a method of rebuilding a failed data storage device is shown. In a RAID data storage system having a processor, memory and a plurality of data storage devices, each data storage device having at least one permanently empty block, the processor may identify one or the plurality of data storage devices as a failed data storage device. The processor may identify 900 one or more permanently empty blocks on the failed data storage device. The processor may also identify 902 one or more permanently empty blocks on the remaining data storage devices in the RAID data storage system. The processor may then rebuild 904 each data block from the failed data storage device by methods known in the art, except for any permanently empty blocks on the failed data storage device. During the rebuild process, the processor may ignore data blocks from the remaining data storage devices that are designated permanently empty blocks. By this method, the process of rebuilding a failed data storage device in a RAID data storage system may be accelerated.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A data storage apparatus comprising:
    a processor;
    memory connected to the processor;
    a plurality of data storage devices connected to the processor, each of the plurality of data storage devices organized into a plurality of equally sized logical data blocks; and
    computer executable program code configured to execute on the processor, wherein:
        the plurality of data storage devices are organized into logical stripes such that one logical data block from each of the plurality of data storage devices is included in each logical stripe;
        each stripe contains at least one empty block;
        each of the plurality of data storage devices contains at least one empty block; and
        the computer executable program code is configured to maintain each empty block as empty space; and
    wherein each of the at least one empty blocks is identified by a numerical property unique to said empty block such that empty blocks are identifiable via a predefined algorithm even when the data storage device containing such empty block is unreadable.

2. The data storage apparatus of claim 1, wherein the computer executable program code is further configured to:
    identify a failed data storage device in the plurality of data storage devices;
    identify one or more empty blocks on the failed data storage device; and
    rebuild each data block on the failed data storage device that is not an empty block.

3. The data storage apparatus of claim 1, wherein the computer executable program code is further configured to:

identify a failed data storage device in the plurality of data storage devices;
identify one or more empty blocks on the failed data storage device;
identify one or more empty blocks in each logical stripe containing each data block on the failed data storage device that is not an empty block;
read each data block in each logical stripe that is not an empty data block;
rebuild each data block on the failed data storage device that is not an empty block by performing an operation on each data block that is not an empty block within the logical stripe including the data block from the failed data storage device.

4. The data storage apparatus of claim 3, wherein the operation is an exclusive disjunction operation according to RAID type parity.

5. The data storage apparatus of claim 3, wherein the operation is an exclusive disjunction operation on bitwise modified data according to RAID 6 type Q parity.

6. The data storage apparatus of claim 1, wherein each stripe contains at least two empty blocks.

7. The data storage apparatus of claim 1, wherein the computer executable program code is further configured to designate one or more empty blocks in the plurality of data blocks in each of the plurality of data storage devices based on a block number.

8. A data storage apparatus comprising:
a processor;
memory connected to the processor;
a plurality of data storage devices connected to the processor, each of the plurality of data storage devices organized into a plurality of equally sized logical data blocks, at least one logical data block being designated as an empty data block; and
computer executable program code configured to execute on the processor, wherein:
the plurality of data storage devices are organized into logical stripes such that one logical data block from each of the plurality of data storage devices is included in each logical stripe;
the computer executable program code is configured to:
incorporate a first additional data storage device, organized into a plurality of equally sized logical data blocks, into the plurality of data storage devices by adding one logical data block from the first additional data storage device to each logical stripe;
move data from a first logical data block in a first logical stripe on a first data storage device in the plurality of data storage devices to a data block in the first logical stripe on the first additional data storage device; and
designate the first logical block as an empty block; and
wherein each of the at least one empty blocks is identified by a numerical property unique to said empty block such that empty blocks are identifiable via a predefined algorithm even when the data storage device containing such empty block is unreadable.

9. The data storage apparatus of claim 8, wherein the computer executable program code is further configured to:
move data from a second logical data block in a second logical stripe on a second data storage device in the plurality of data storage devices to a data block in the second logical stripe on the first additional data storage device; and designate the second logical block as an empty block.

10. The data storage apparatus of claim 9, wherein the computer executable program code is further configured to:
identify a failed data storage device in the plurality of data storage devices;
identify one or more empty blocks on the failed data storage device; and
rebuild each data block on the failed data storage device that is not an empty block.

11. The data storage apparatus of claim 9, wherein the computer executable program code is further configured to:
identify a failed data storage device in the plurality of data storage devices;
identify one or more empty blocks on the failed data storage device;
identify one or more empty blocks in each logical stripe containing each data block on the failed data storage device that is not an empty block;
read each data block in each logical stripe that is not an empty block;
rebuild each data block on the failed data storage device that is not an empty block by performing an operation on each data block that is not an empty block within the logical stripe including the data block from the failed data storage device.

12. The data storage apparatus of claim 11, wherein the operation is an exclusive disjunction operation according to RAID type parity.

13. The data storage apparatus of claim 11, wherein the operation is an exclusive disjunction operation on bitwise modified data according to RAID 6 type Q parity.

14. The data storage apparatus of claim 8, wherein the computer executable program code is further configured to designate the first logical block as an empty block based on a block number of the first logical block.

15. The data storage apparatus of claim 8, wherein the computer executable program code is further configured to:
incorporate a second additional data storage device, organized into a plurality of equally sized logical data blocks, into the plurality of data storage devices by adding one logical data block from the second additional data storage device to each logical stripe;
move data from a third logical data block in the first logical stripe on a third data storage device in the plurality of data storage devices to a data block in the first logical stripe on the second additional data storage device; and
designate the third logical block as an empty block.

16. The data storage apparatus of claim 15, wherein the computer executable program code is further configured to:
identify a failed data storage device in the plurality of data storage devices;
identify one or more empty blocks on the failed data storage device;
identify one or more empty blocks in each logical stripe containing each data block on the failed data storage device that is not an empty block;
read each data block in each logical stripe that is not an empty block;
rebuild each data block on the failed data storage device that is not an empty block by performing an operation on each data block that is not an empty block within the logical stripe including the data block from the failed data storage device.

17. A method for accelerating rebuild operations in a RAID data storage apparatus comprising:
identifying a failed data storage device in a plurality of data storage devices, wherein each of the plurality of data storage devices is organized into a plurality of equally sized logical data blocks, at least one logical data block being designated as an empty data block, and wherein the plurality of data storage device are organized into one or more logical stripes, each logical stripe containing one logical data block from each of the plurality of data storage devices;

identifying one or more empty blocks on the failed data storage device based on a block number associated with each of the one or more empty blocks;

identifying one or more empty blocks in each of the one or more logical stripes containing each data block on the failed data storage device that is not an empty block;

reading each data block in each of the one or more logical stripes that is not an empty data block; and rebuilding each data block on the failed data storage device that is not an empty block by performing an operation on each data block that is not an empty block within the logical stripe containing the data block from the failed data storage device, wherein each of the at least one empty blocks is identified by a numerical property unique to said empty block such that empty blocks are identifiable via a predefined algorithm even when data storage device containing such empty block is unreadable.

18. The method of claim 17, further comprising:

incorporating a first additional data storage device, organized into a plurality of equally sized logical data blocks, into the plurality of data storage devices by adding one logical data block from the first additional data storage device to each logical stripe; and moving data from a first logical data block in a first logical stripe on a first data storage device in the plurality of data storage devices to a data block in the first logical stripe on the first additional data storage device, wherein the first logical block is designated as an empty block based on a block number associated with the first logical block.

19. The method of claim 18, further comprising:

moving data from a second logical data block in a second logical stripe on a second data storage device in the plurality of data storage devices to a data block in the second logical stripe on the first additional data storage device, wherein the second logical block is designated as an empty block based on a block number associated with the second logical block.

20. The method of claim 19, further comprising:

incorporating a second additional data storage device, organized into a plurality of equally sized logical data blocks, into the plurality of data storage devices by adding one logical data block from the second additional data storage device to each logical stripe; and moving data from a third logical data block in a first logical stripe on a third data storage device in the plurality of data storage devices to a data block in the first logical stripe on the second additional data storage device, wherein the third logical block is designated as an empty block based on a block number associated with the third logical block.

* * * * *